(12) United States Patent
Barsness et al.

(10) Patent No.: US 8,805,799 B2
(45) Date of Patent: Aug. 12, 2014

(54) DYNAMIC PARTIAL UNCOMPRESSION OF A DATABASE TABLE

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1698 days.

(21) Appl. No.: 11/834,840

(22) Filed: Aug. 7, 2007

(65) Prior Publication Data

US 2009/0043734 A1 Feb. 12, 2009

(51) Int. Cl.
*G06F 17/30* (2006.01)

(52) U.S. Cl.
USPC ........................................................ 707/693

(58) Field of Classification Search
CPC .................... G06F 17/30135; G06F 17/30424; G06F 17/30442; G06F 17/30554
See application file for complete search history.

(56) References Cited

U.S. PATENT DOCUMENTS

| | | | |
|---|---|---|---|
| 5,276,898 A * | 1/1994 | Kiel et al. | 718/105 |
| 5,742,806 A | 4/1998 | Reiner et al. | |
| 5,794,229 A | 8/1998 | French et al. | |
| 5,893,102 A | 4/1999 | Maimone et al. | |
| 5,918,225 A | 6/1999 | White et al. | |
| 5,930,466 A | 7/1999 | Rademacher | |
| 5,946,692 A | 8/1999 | Faloutsos et al. | |
| 6,343,293 B1 | 1/2002 | Lyle | |
| 6,374,250 B2 | 4/2002 | Ajtai et al. | |
| 6,549,995 B1 | 4/2003 | Schulz et al. | |
| 6,577,254 B2 | 6/2003 | Rasmussen | |
| 6,691,132 B2 | 2/2004 | Walker et al. | |
| 6,766,334 B1 | 7/2004 | Kaler et al. | |
| 7,050,639 B1 | 5/2006 | Barnes et al. | |
| 7,058,783 B2 | 6/2006 | Chandrasekaran et al. | |
| 7,103,608 B1 | 9/2006 | Ozbutun et al. | |

(Continued)

FOREIGN PATENT DOCUMENTS

| | | |
|---|---|---|
| WO | 0021022 A2 | 4/2000 |
| WO | 02093455 A2 | 11/2002 |
| WO | 03/096230 A2 | 11/2003 |
| WO | 2008/009135 A2 | 1/2008 |

OTHER PUBLICATIONS

Poess, Meikel et al, "Data Compression in Oracle", Proceedings of the 29th VLDB Conference, Berlin, Germany, 2003, pp. 937-947.

(Continued)

*Primary Examiner* — Dinku Gebresenbet
(74) *Attorney, Agent, or Firm* — Martin & Associates, LLC; Derek P. Martin

(57) ABSTRACT

A database dynamic partial uncompression mechanism determines when to dynamically uncompress one or more compressed portions of a database table that also includes uncompressed portions. A query may include an express term that specifies whether or not to skip compressed portions. In addition, a query may include associated information that specifies whether or not to skip compressed portions, and one or more thresholds that may be used to determine if the system is too busy to perform uncompression. A display mechanism may also determine whether or not to display compressed portions. The uncompression may occur at the database server or at a client. The database dynamic partial uncompression mechanism thus performs dynamic uncompression in a way that preferably uncompresses one or more compressed portions of a partially compressed database table only when the compressed portions satisfy a query and/or need to be displayed.

1 Claim, 8 Drawing Sheets

(56) References Cited

U.S. PATENT DOCUMENTS

| | | |
|---|---|---|
| 7,113,936 B1 | 9/2006 | Michel et al. |
| 7,127,449 B2 | 10/2006 | Barsness et al. |
| 7,181,457 B2 * | 2/2007 | Reinauer et al. ............... 707/10 |
| 7,216,291 B2 * | 5/2007 | Kim .............................. 715/227 |
| 7,480,643 B2 | 1/2009 | Barsness et al. |
| 2001/0054131 A1 | 12/2001 | Alvarez et al. |
| 2003/0028509 A1 | 2/2003 | Sah et al. |
| 2005/0015374 A1 | 1/2005 | Reinauer et al. |
| 2005/0160074 A1 | 7/2005 | Vos et al. |
| 2006/0123035 A1 | 6/2006 | Ivie |
| 2008/0071818 A1 | 3/2008 | Apanowicz et al. |
| 2008/0162523 A1 * | 7/2008 | Kraus et al. ................... 707/101 |
| 2009/0043734 A1 | 2/2009 | Barsness et al. |
| 2009/0043792 A1 | 2/2009 | Barsness et al. |

OTHER PUBLICATIONS

Jonathan Goldstein et al., "Compressing Relations and Indexes", Data Engineering, 1998. Proceedings, 14th International Conference, Feb. 23-27, 1998, pp. 370-379.

* cited by examiner customerLog table

600

| customerNumber integer | customerName char(50) | transID integer | transDetails char(500) | sellerText varchar(2000) | commentText varchar(2000) |
|---|---|---|---|---|---|
| | | <comp> | <comp> | <comp> | |
| ⋮ | ⋮ | ⋮ | ⋮ | ⋮ | ⋮ |
| | | <comp> | <comp> | <comp> | |

| 702 | 704 | 706 | 708 | 710 | 712 | 714 | 716 | 718 | 720 | 722 | 724 |
|---|---|---|---|---|---|---|---|---|---|---|---|
| Query ID | App ID | Client ID | Job ID | User ID | Sec. Flag | DU Flag | CPU % | IO Count | Mem Used | First Touch | At Client |
| | | | | | | | | | | | |
| ⋮ | ⋮ | ⋮ | ⋮ | ⋮ | ⋮ | ⋮ | ⋮ | ⋮ | ⋮ | ⋮ | ⋮ |
| | | | | | | | | | | | |

FIG. 7 select customerName, transDetails from customerLog
where customerName="John S" skipCompressed

| customerName | transDetails |
|---|---|
| John S | Purchased 2 tickets to Redsox game |
| John S | Purchased 1 ticket to opera in New York |
| John S | Purchased 1 ticket to opera in New York |
| John S | Purchased 1 ticket to ride ferry boat |

| customerName | transDetails |
|---|---|
| John S | <compressed> |
| John S | <compressed> |
| John S | <compressed> |
| John S | <compressed> |

| customerName | transDetails |
|---|---|
| John S | Purchased 2 tickets to Redsox game |
| John S | <compressed> |
| John S | <compressed> |
| John S | <compressed> |

FIG. 14

DYNAMIC PARTIAL UNCOMPRESSION OF A DATABASE TABLE

CROSS-REFERENCE TO RELATED APPLICATIONS

This patent application is related to the following U.S. patent applications: "PARTIAL COMPRESSION OF A DATABASE TABLE BASED ON HISTORICAL INFORMATION", Ser. No. 11/834,837, filed on Aug. 7, 2007; and PARALLEL UNCOMPRESSION OF A PARTIALLY COMPRESSED DATABASE TABLE, Ser. No. 11/834,842, filed on Aug. 7, 2007. Both of these related patent applications are incorporated herein by reference.

BACKGROUND

1. Technical Field

This disclosure generally relates to computer systems, and more specifically relates to database systems.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database. Retrieval of information from a database is typically done using queries. A database query typically includes one or more predicate expressions interconnected with logical operators.

Database compression has been known for some time as a way to reduce the size of a table that is not often used. In the prior art, if compression is performed, it is performed on an entire database table. Once a table is compressed, it cannot be queried until it is uncompressed. If the data in the table is then needed, the entire table must be uncompressed, then a query may be executed to access data in the table. The cost in processor overhead of compressing and uncompressing a database table can be significant, especially for large tables. For this reason, compression/uncompression schemes have typically been limited to applications when the likelihood of needing data that has been compressed is low.

The first related application referenced above provides a way to partially compress a portion of a database table without compressing all of the database table. Portions that may be compressed include columns, parts of columns, and rows. When a database table has one or more compressed portions, the issue now arises regarding how to deal with the compressed portions. For example, one suitable way to handle compressed portions would be to uncompress a compressed portion when the portion is touched by a query. Note, however, that a query may cause a table scan to be performed that touches all rows even though most of the rows do not satisfy the query. Uncompressing on first touch in this manner may cause uncompression of portions of the table that are not needed. Without a way to perform dynamic uncompression of portions of a partially compressed database table in an intelligent manner, the partial compression taught in the first related application will have limited value.

BRIEF SUMMARY

A database dynamic partial uncompression mechanism determines when to dynamically uncompress one or more compressed portions of a database table that also includes uncompressed portions. A query may include an express term that specifies whether or not to skip compressed portions. In addition, a query may include associated information that specifies whether or not to skip compressed portions, and one or more thresholds that may be used to determine if the system is too busy to perform uncompression. A display mechanism may also determine whether or not to display compressed portions. The uncompression may occur at the database server or at a client. The database dynamic partial uncompression mechanism thus performs dynamic uncompression in a way that preferably uncompresses one or more compressed portions of a partially compressed database table only when the compressed portions satisfy a query and/or need to be displayed.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 6 is a sample customerLog table that includes both compressed portions and uncompressed portions;

FIG. 7 is sample information associated with queries that may determine if, how and where dynamic uncompression occurs;

FIG. 8 is a sample query showing use of a skipCompressed parameter to skip when executing the query portions in the database table that are compressed;

FIG. 12 is a sample display of a result set when all rows are uncompressed;

FIG. 13 is a sample display of a result set when all rows are compressed; and

FIG. 14 is a sample display of a result set when one row is uncompressed and other rows are compressed.

DETAILED DESCRIPTION

The claims and disclosure herein provide a way to dynamically uncompress and display one or more portions of a database table that has one or more portions compressed while other portions of the database table are uncompressed. In one implementation, a parameter may be specified in a query that causes compressed portions to be skipped when the query is executed. Information associated with a query may include a flag or other information that specifies whether or not to include compressed portions of the database table in the result set and where to perform the uncompression. In addition, a display mechanism may determine whether and how to display a compressed portions of a database table that are in a result set for a query.

Figure 1:
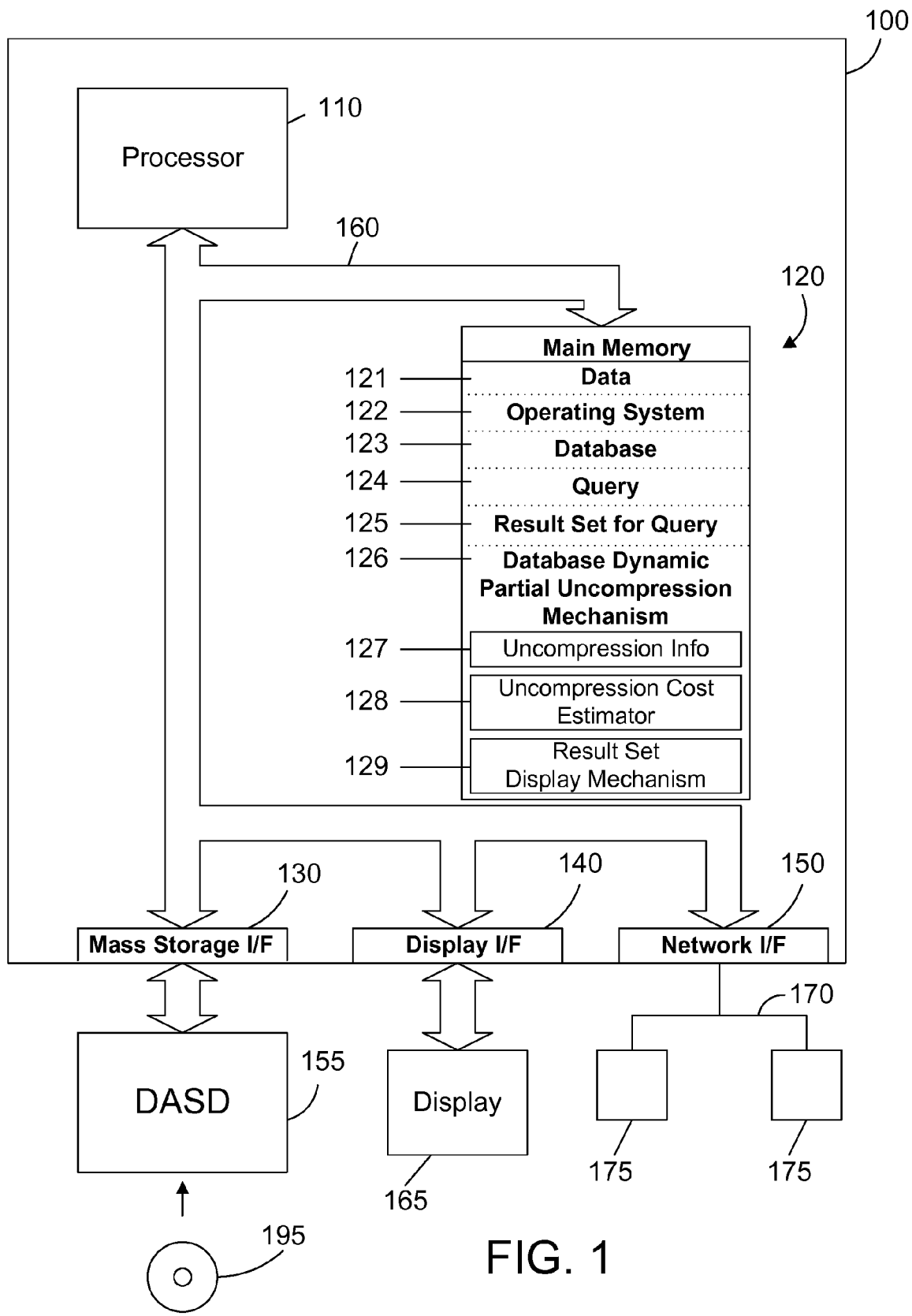
FIG. 1 is a block diagram of an apparatus that performs dynamic partial uncompression of one or more portions of a database table that is partially compressed.

Referring to FIG. 1, a computer system 100 is one suitable implementation of a computer system that includes a database dynamic partial uncompression mechanism that dynamically uncompresses a portion of a database table according to specified criteria when the compressed portion is in a result set and/or needs to be displayed. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a database 123, a query 124, a result set 125 for the query 124, and a database dynamic partial uncompression mechanism 126. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. Database 123 is any suitable database, whether currently known or developed in the future. Database 123 preferably includes one or more tables that have one or more compressed portions and one or more uncompressed portions. Query 124 is any suitable database query, including an SQL query. The result set for the query 125 includes the results returned from executing query 124.

The database dynamic partial uncompression mechanism 126 performs partial uncompression of portions of a database table according to specified uncompression information 127, according to the results of an uncompression cost estimator 128, and displays the result set 125 for query 124 using to a result set display mechanism 129. The particular method used by the database dynamic partial uncompression mechanism for uncompressing compressed portions of the database depends on the method used for compressing those portions, and preferably returns the data to its original state before it was compressed after it is uncompressed. The uncompression information 127 may include information specified in a query, information associated with a query but not specified in the query, information that determines how rows in a result set are displayed and information that determines where the uncompression is performed. The uncompression cost estimator 128 is used to estimate the cost of uncompression so an intelligent decision may be made regarding whether uncompression is desirable. For example, if utilization of the processor 110 exceeds a predetermined threshold, the uncompression cost estimator 128 could decide not to do uncompression because the processor is too busy. If IO count exceeds a predetermined threshold, the uncompression cost estimator 128 could decide not to do uncompression because the IO count is too high. If memory utilization exceeds a predetermined threshold, the uncompression cost estimator 128 could decide not to do uncompression because the memory utilization is too high. The result set display mechanism 129 determines whether compressed portions in a result set are displayed, and if so, how they are displayed.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, query 124, result set for query 125, and database dynamic partial uncompression mechanism 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a database dynamic partial uncompression mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the database dynamic partial uncompression mechanism may be distributed as an article of manufacture in a variety of forms, and the claims extend to all suitable types of computer-readable media that bear instructions that may be executed by a computer. Examples of suitable computer-readable media include recordable media such as floppy disks and CD-RW (e.g., 195 of FIG. 1).

The database dynamic partial uncompression mechanism may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
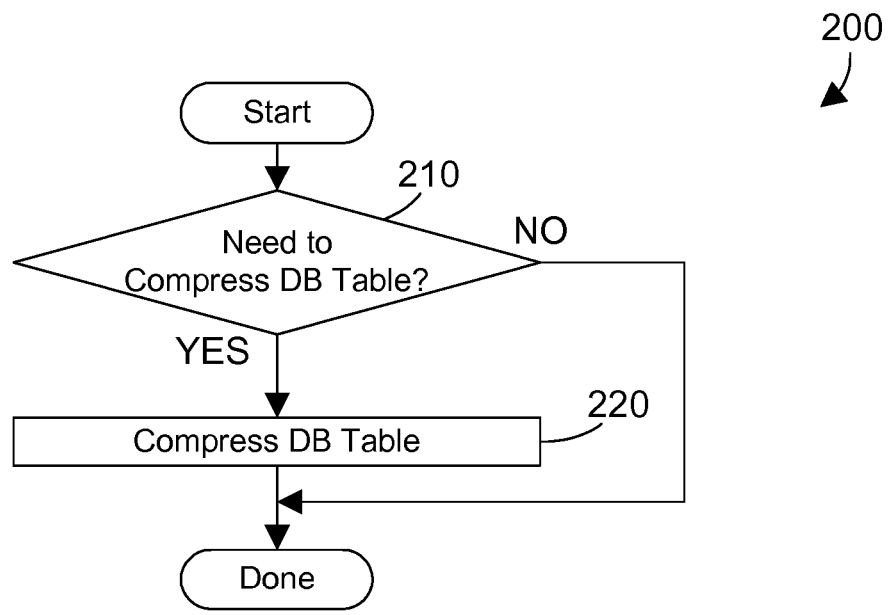
FIG. 2 is a flow diagram of a prior art method for compressing an entire database table.

Referring to FIG. 2, a flow diagram of a method 200 shows how compression of a database table is performed in the prior art. If there is a need to compress a database table (step 210=YES), the entire database table is compressed (step 220). If there is no need to compress the database table (step 210=NO), the table is not compressed. In the prior art, compression was only done on a table basis. Nowhere does the prior art show compression of a portion of a database table without compressing all of the database table.

Figure 3:
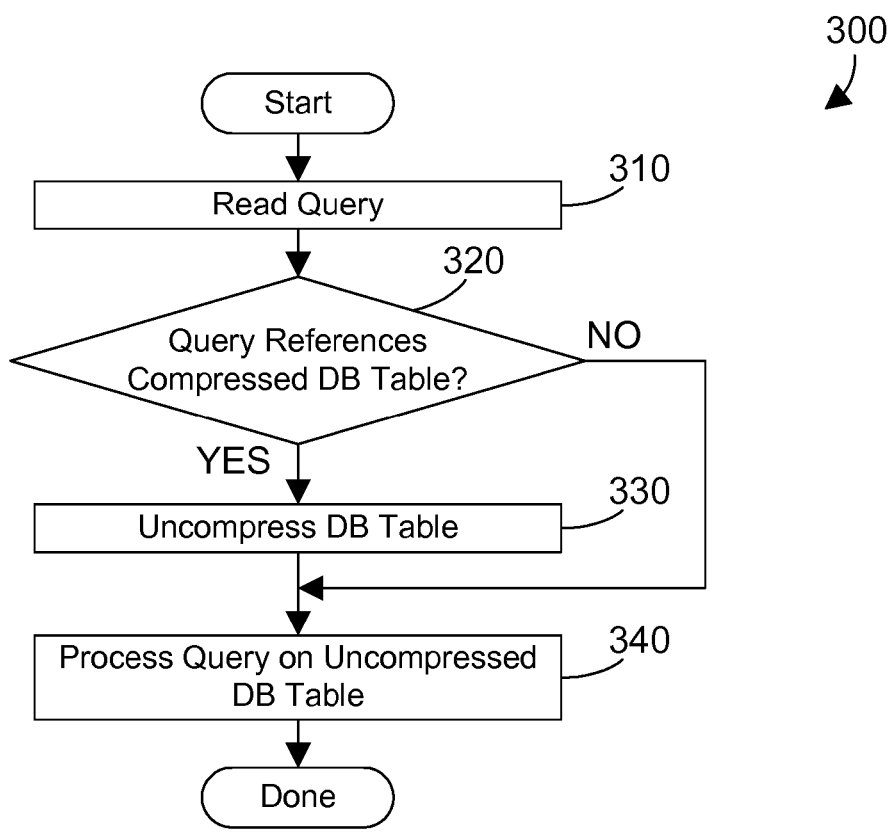
FIG. 3 is a flow diagram of a prior art method for processing a query.

Referring to FIG. 3, a flow diagram of a method 300 shows how a query is processed in the prior art. A query is read (step 310). If the query does not reference a compressed database table (step 320=NO), the query is processed on the uncompressed database table (step 340). If the query references a compressed database table (step 320=YES), the entire database table is uncompressed (step 330), and the query is then processed on the uncompressed database table (step 340). FIGS. 2 and 3 illustrate that compression and decompression in a known database is done on a table-by-table basis. A query can only be processed on an uncompressed table. If a table needs to be compressed, all portions of the table are compressed. If a compressed table needs to be queried, the entire table must be uncompressed, then the uncompressed table may be queried. Because of the relatively high processing cost associated with compressing an entire table, then uncompressing the entire table when a query references the table, database compression is typically reserved for those applications when it is relatively unlikely that a table will be used. The result is the benefits of compression are not fully realized when compressing database tables in the prior art.

Figure 4:
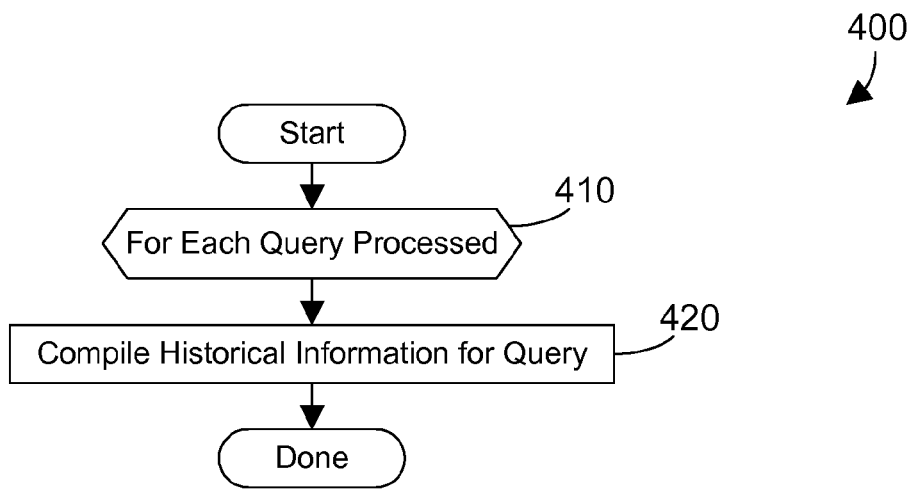
FIG. 4 is a flow diagram of a method for compiling historical information when queries are processed.

The first related application referenced above discloses a way to compress one or more portions of a database table without compressing all portions of the database table. Methods disclosed in the first related application include methods 400 and 500 in FIGS. 4 and 5, respectively. Referring to FIG. 4, a method 400 shows how historical information may be gathered. For each query processed (step 410), the historical information for the query is compiled (step 420). Note that historical information may include any suitable historical information that may help determine whether or not to partially compress a database table. For example, in one suitable implementation, the historical information includes a separate file for each database table, with the historical information relating to a table being stored in that table's corresponding file. In another example, historical information may include details of all queries executed, along with information regarding which portions of each database table were referenced by each query.

Figure 5:
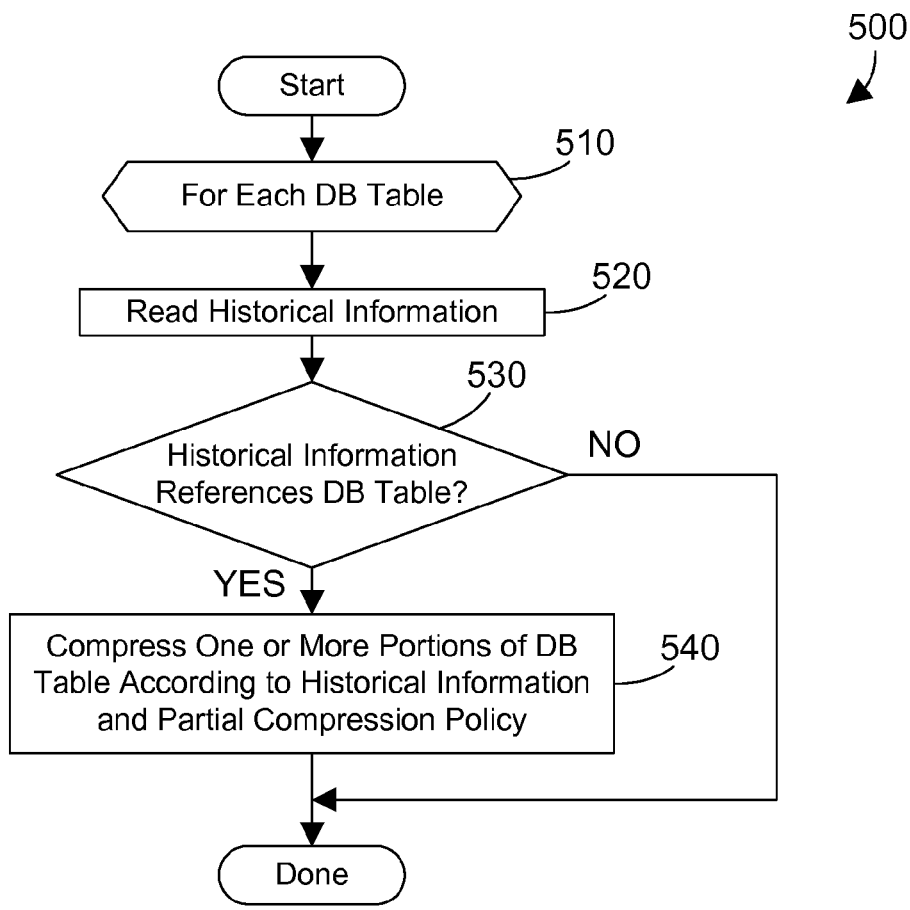
FIG. 5 is a block diagram of a method for compressing one or more portions of a database table based on historical usage information and based on a partial compression policy specified by a user.

Method 500 in FIG. 5 shows how the historical information collected in FIG. 4 may be used to compress one or more portions of a database table without compressing all portions of the database table. For each database table (step 510), the historical information is read (step 520). If the historical information does not reference the specific database table of interest (step 530=NO), method 500 is done. If the historical information references the database table (step 530=YES), one or more portions of the database table may be compressed according to the historical information and optionally according to a partial compression policy (step 540).

A simple example is now provided to illustrate the concepts discussed in general terms above. Referring to FIG. 6, a table 600 called customerLog includes the following columns: customerNumber, customerName, transID, transDetails, sellerText, and commentText. Table 600 is one suitable example of a database table that includes portions that are uncompressed, namely the customerNumber, customerName and commentText columns, and portions that are compressed, namely transID, transDetails and sellerText. The generation of a database table with portions that are compressed is discussed in detail in the first related application.

Referring to FIG. 7, a table 700 is shown that contains information external to queries that is related to the queries. Table 700 is one suitable example of uncompression information 127 shown in FIG. 1. The Query ID field 702 stores the identifier for a query. The Application ID field 704 specifies which application calls the query. The Client ID field 706 specifies which client calls the query. The Job ID field 708 specifies the job that calls the query. The User ID field 710 specifies which user calls the query. The Secondary Flag field 712 defines a flag that specifies whether secondary records are included in the result set. As used herein, secondary records are records that include one or more compressed portions. When the Secondary Flag is set, this means the result set will include records that include one or more compressed portions.

The Display Uncompressed field 714 specifies whether compressed portions in a the query's result set should be displayed uncompressed. The CPU % field 716 specifies a predetermined threshold for processor utilization that may be used in determining whether or not to uncompress one or more compressed portions in a result set. If the current processor utilization exceeds the predetermined threshold, dynamic uncompression may not be done because the processor is too busy. The IO Count field 718 specifies a predetermined threshold for IO Count that may be used in determining whether or not to uncompress one or more compressed portions in a result set. If the current IO count exceeds the predetermined threshold, dynamic uncompression may not be done because the IO count is too high. The Memory Used field 720 specifies a predetermined threshold for memory usage that may be used in determining whether or not to uncompress one or more compressed portions in a result set. If memory usage is above the predetermined threshold in the Memory Used field 720, dynamic uncompression may not be done because the memory utilization is too high. The First Touch field 722 defines a flag that specifies whether or not compressed portions are uncompressed at first touch. When the First Touch flag is set, uncompressed portions are uncompressed at first touch. When the First Touch flag is cleared, compressed portions are not necessarily uncompressed at first touch. The At Client field 724 specifies a flag that specifies where to perform the dynamic uncompression. When the At Client flag 724 is set, dynamic uncompression is done at the client instead of at the database server where the table resides. When the At Client flag 724 is cleared, dynamic uncompression is not necessarily done at the client, but can be done at the database server as well. The At Client flag 724 allows off-loading the dynamic uncompression to client computer systems that need the data, thereby freeing up the database server from performing uncompression tasks. When both the First Touch flag and the At Client flag are set, this means uncompression will be performed on the client computer system on first touch of a compressed portion from the application perspective. Uncompressing upon first touch from an application perspective prevent uncompressing rows that are touched by the database manager (e.g., in performing a table scan) and uncompresses only those compressed portions that are actually touched by the application.

The Secondary flag 712, Display Uncompressed flag 714, CPU % threshold 716, Count threshold 718, and Memory Used threshold 720 may all be used by the uncompression cost estimator 128 to determine whether the cost of uncompression is such that uncompression is warranted. If the cost of uncompression is not too high, uncompression may be performed on one or more compressed portions of a database table. In the most preferred implementation, only those compressed portions of a database table that satisfy a query are uncompressed. However, the disclosure and claims herein expressly extend to uncompressing any and all compressed portions of a database table, regardless of whether the compressed portions satisfy a query.

Each of the fields 702-724 shown in FIG. 7 may be specified by a user, and this information may then be used by the database dynamic partial uncompression mechanism 126 to determine whether to uncompress one or more portions of a database table that includes both compressed portions and uncompressed portions, and where to perform the uncompression.

When a portion of a database table has been compressed, various heuristics may be used to determine whether the compressed portion needs to be uncompressed. However, compressing rows that are rarely accessed may give rise to performance penalties if a query performs a full table scan, which touches all rows even though many of the rows are not used. If each row had to be uncompressed for each table scan, the uncompressing of rows could result in substantial overhead that may negate the benefit of performing the compression. This problem may be avoided by adding to the SQL syntax the ability to skip compress rows or to uncompress compressed rows. This could be done, for example, by defining a "skipCompressed" parameter that could be specified in an SQL query, as shown in FIG. 8. By adding this feature to the SQL syntax, the user may select on a query-by-query basis whether to skip compressed rows or whether to uncompress compressed rows. When skipCompressed is specified as a parameter in a query, the compressed portions of the database table that satisfy the query are preferably not included in the result set.

Figure 9:
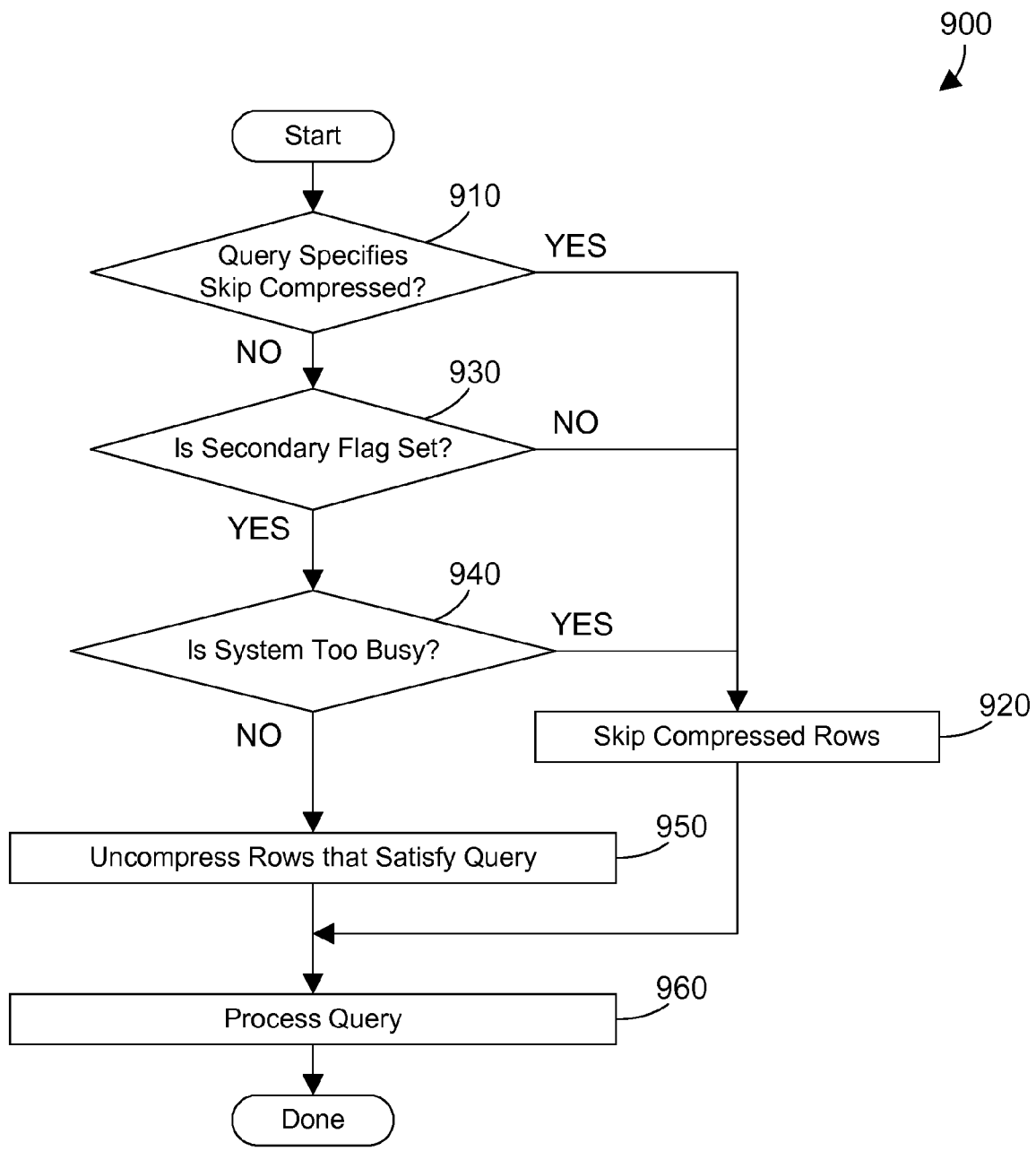
FIG. 9 is a flow diagram of a method for using uncompression information to determine whether or not to perform dynamic uncompression.

Referring to FIG. 9, a method 900 is preferably performed by the database dynamic partial uncompression mechanism 126 shown in FIG. 1. Method 900 begins by determining whether the query includes a parameter to skip compressed portions (step 910). If so (step 910=YES), the compressed rows are skipped (step 920) and the query is processed (step 960). If the query does not include a parameter to skip compressed rows (step 910-NO), method 900 determines whether the Secondary flag is set (step 930). As explained above with reference to FIG. 7, if the Secondary flag 712 is set, compressed portions are included in the result set. Thus, if the Secondary flag is not set (step 930=NO), the compressed rows are skipped (step 920), which means rows with compressed data are not included in the result set for the query. If the Secondary flag is set (step 930=YES), method 900 then determines if the system is too busy to dynamically uncompress compressed portions (step 940). The system may be too busy in step 940 if the current processor utilization exceeds the predetermined threshold specified in the CPU % field 716 in FIG. 7; if the current IO count exceeds the predetermined threshold specified in the IO Count field 718 in FIG. 7; if the current memory usage exceeds the predetermined threshold specified in the Memory Used field 720 in FIG. 7; or any suitable heuristic that takes one or more of these thresholds into account. If the system is too busy according to one or more of these fields (step 940=YES), compressed rows are skipped (step 920). If the system is not too busy (step 940=NO), the rows that satisfy the query are uncompressed (step 950). The query is then processed (step 960) to return a result set, such as result set 125 in FIG. 1.

Figure 10:
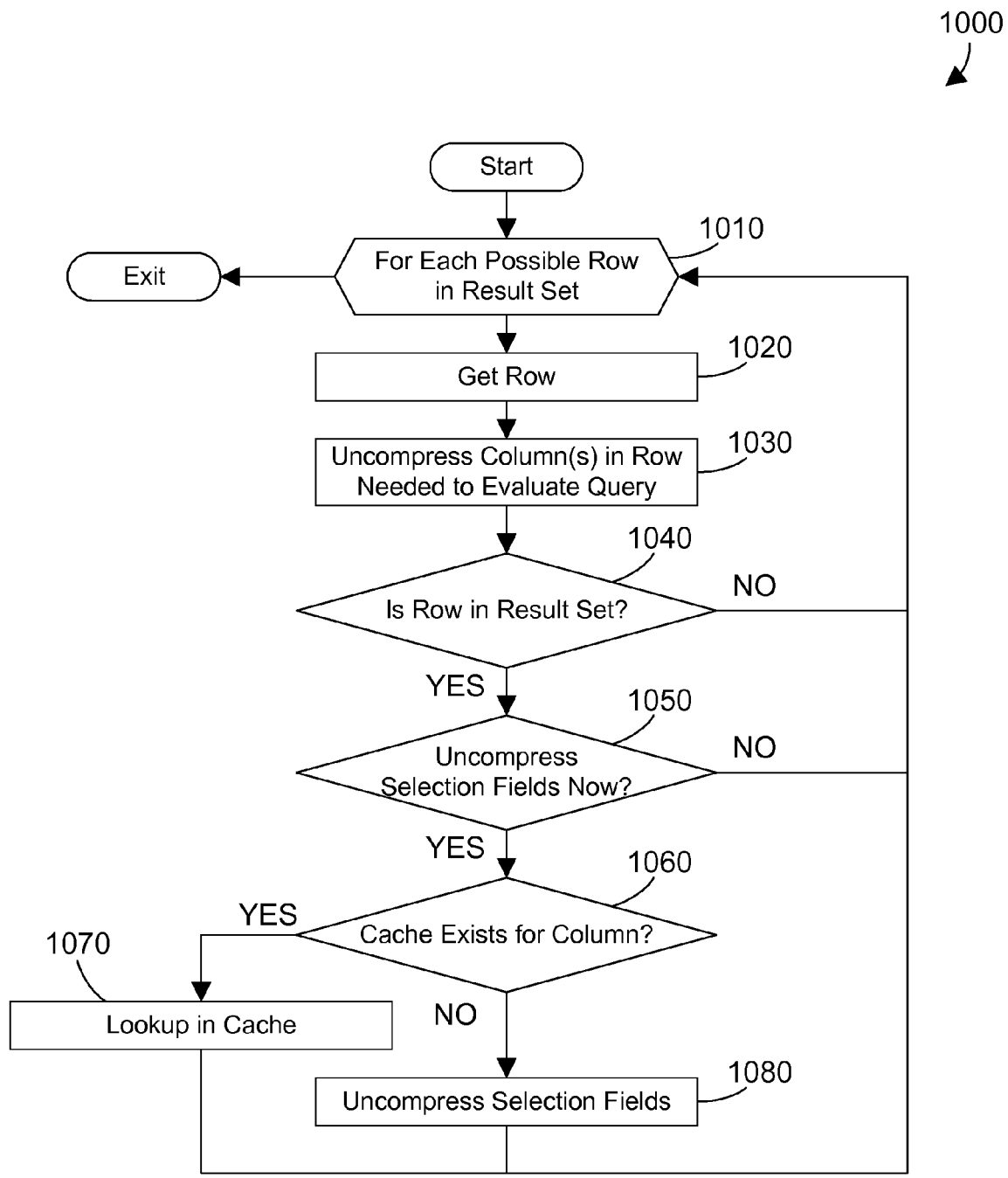
FIG. 10 is a flow diagram of a method for processing rows in a result set.

Referring to FIG. 10, a method 1000 is preferably performed by the database dynamic partial uncompression mechanism 126 shown in FIG. 1. Method 1000 analyzes each possible row in the result set (step 1010), and exits when all possible rows have been evaluated. First a row is retrieved (step 1020). Any compressed columns in the row that are needed to evaluate the query are uncompressed (step 1030). If the row is not in the result set (step 1040=NO), method 1000 loops back to step 1010 and continues. If the row is in the result set (step 1040=YES), but the compressed fields should not be uncompressed now (step 1050=NO), method 1000 loops back to step 1010 and continues. If the compressed fields should be compressed now (step 1050=YES), method 1000 determines whether a cache exists for the column (step 1060). For example, a cache could be provided for uncompressed column data if uncompressing a column would take excessive system resources such as memory and processor utilization. If a cache exists for the column (step 1060=YES), the needed uncompressed data is accessed in the cache (step 1070). If no cache exists for the column (step 1060=NO), the selection fields are uncompressed (step 1080). Note the cache for uncompressed column data is optional, and thus may be omitted.

Figure 11:
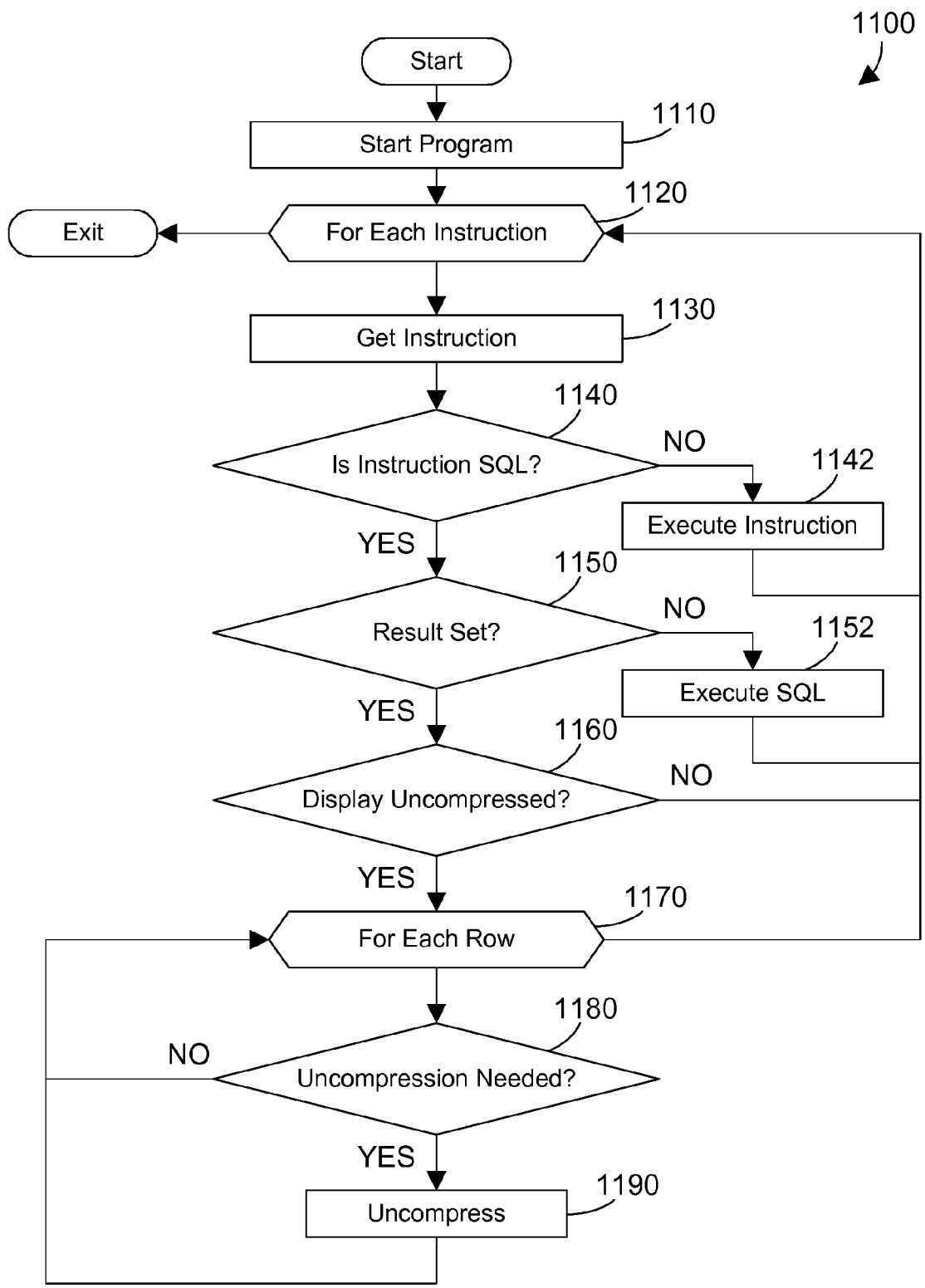
FIG. 11 is a flow diagram of a method for displaying a result set.

Referring to FIG. 11, a method 1100 shows how uncompression could be done at a client that executes a computer program. The program is started (step 1110). For each instruction (step 1120), the instruction is retrieved (step 1130). If the instruction is not SQL (step 1140=NO), the instruction is executed (step 1142), and method 1100 loops back to step 1120 for the next instruction. If the instruction is SQL (step 1140=YES), but there is no result set to return (step 1150=NO), the SQL is executed (step 1152). Examples of SQL instructions that do not return a result set include an update statement, an insert statement, a delete statement, etc. If the SQL instruction returns a result set (step 1150=YES), and if the compressed portions are not specified to be displayed uncompressed (step 1160=NO), method 1100 loops back to step 1120 for the next instruction. If the compressed portions are to be displayed uncompressed (step 1160=YES), for each row (step 1170), if uncompression is needed (step 1180=YES), one or more compressed portions of the row are uncompressed (step 1190). This continues until all rows have been processed in step 1170 and all instructions have been executed in step 1120, at which point method 1100 exits. Dynamic uncompression at a client as shown in FIG. 11 relieves a database server of the overhead of uncompressing compressed portions of a database table in response to a query by the client. Instead, the client performs the uncompression of the needed data.

The result set display mechanism 129 determines how to display a result set. As shown in table 600 in FIG. 6, the customerName column is uncompressed, and the transDetails column is compressed, as indicated by comp> in the transDetails column. Let's assume the following query is executed against the customerLog table 600 in FIG. 6:

select customerName, transDetails from customerLog where customerName="John S"

Notice this is the same query in FIG. 8 except the "skipCompressed" parameter is not included. We assume for this example there are four records (or rows) in the customerLog table 600 in FIG. 6 that satisfy this query. In the first example shown in display 1200 in FIG. 12, we assume the Display Uncompressed flag 714 in FIG. 7 is set. As a result, the compressed data in the transDetails column is uncompressed and displayed, as shown in FIG. 12. If the Display Uncompressed flag 714 in FIG. 7 were cleared, the compressed data could simply be labeled as compressed, as shown in display 1300 in FIG. 13. Even with the transDetails compressed as shown in FIG. 13, one can determine that customer John S has four transactions in the customerLog table 600.

Now let's assume the Display Uncompressed flag 714 is cleared, but a previous query execution caused the first transaction shown in FIG. 12 to be uncompressed, while the other three transactions remain compressed. In this case, the result set could be displayed as shown in FIG. 14, where the uncompressed data is displayed while the compressed data remains compressed. The result set display mechanism 129 can thus display uncompressed data, compressed data, or any suitable combination of the two.

The uncompression mechanism disclosed and claimed herein allows one or more compressed portions of a database table that includes both compressed portions and uncompressed portions to be dynamically uncompressed. Dynamic uncompression may be performed based on information relating to uncompression that is specified by a user. This information may include information that specifies to skip compressed rows, that specifies various thresholds for determining whether or not to do dynamic uncompression, and that specifies where to perform the dynamic uncompression. In addition, a result set display mechanism determines how to display a result set when the result set may contain one or more compressed portions.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A computer-implemented method for processing a query to a database table that includes at least one portion that is compressed and at least one portion that is uncompressed, the method comprising the steps of:
   (A) determining which portions of the database table satisfy the query;
   (B) determining whether utilization of a processor executing the query exceeds a predetermined threshold;
   (C) determining whether utilization of memory exceeds a predetermined threshold;
   (D) determining whether IO count exceeds a predetermined threshold;
   (E) determining whether the query includes a parameter that specifies to skip compressed portions;
   (F) determining whether stored data relating to the query indicates to skip compressed portions;
   (G) if any of (B), (C), (D), (E) and (F) are true, displaying a result set for the query that does not include the compressed portions; and
   (H) if all of (B), (C), (D), (E) and (F) are false, displaying a result set for the query that includes uncompressed information corresponding to the compressed portions, wherein the uncompressed information is generated on a client computer system coupled to a database server that includes the database table.

\* \* \* \* \*